US008364700B2

(12) United States Patent
Huang et al.

(10) Patent No.: US 8,364,700 B2
(45) Date of Patent: Jan. 29, 2013

(54) METHOD AND APPARATUS FOR RAPID DATA ACCESS AND DISTRIBUTION USING STRUCTURED IDENTIFIERS

(75) Inventors: Kevin Huang, Princeton Junction, NJ (US); Domenic Cicchino, Freehold, NJ (US)

(73) Assignee: Vonage Network LLC, Holmdel, NJ (US)

( * ) Notice: Subject to any disclaimer, the term of this patent is extended or adjusted under 35 U.S.C. 154(b) by 250 days.

(21) Appl. No.: 12/785,280

(22) Filed: May 21, 2010

(65) Prior Publication Data

US 2011/0289101 A1    Nov. 24, 2011

(51) Int. Cl.
G06F 7/00    (2006.01)
G06F 17/30   (2006.01)

(52) U.S. Cl. .................. 707/769; 707/797; 709/213

(58) Field of Classification Search ............... 707/769, 707/797; 709/213
See application file for complete search history.

(56) References Cited

U.S. PATENT DOCUMENTS

| | | | | |
|---|---|---|---|---|
| 4,706,080 A | * | 11/1987 | Sincoskie | 370/401 |
| 5,333,188 A | * | 7/1994 | Bogart et al. | 379/221.14 |
| 5,848,404 A | * | 12/1998 | Hafner et al. | 707/769 |
| 6,014,659 A | * | 1/2000 | Wilkinson, III et al. | 707/769 |
| 6,061,679 A | * | 5/2000 | Bournas et al. | 707/999.003 |
| 6,061,712 A | * | 5/2000 | Tzeng | 709/202 |
| 6,067,574 A | * | 5/2000 | Tzeng | 709/247 |
| 6,233,574 B1 | * | 5/2001 | Ladwig et al. | 707/741 |
| 6,266,706 B1 | * | 7/2001 | Brodnik et al. | 709/242 |
| 6,490,592 B1 | * | 12/2002 | St. Denis et al. | 707/999.102 |
| 6,907,032 B2 | * | 6/2005 | Eastman | 370/352 |
| 7,072,885 B2 | * | 7/2006 | Cao et al. | 707/999.003 |
| 7,277,885 B2 | * | 10/2007 | Eppley et al. | 707/999.002 |
| 7,395,262 B1 | * | 7/2008 | Rothrock | 707/999.001 |
| 7,415,463 B2 | * | 8/2008 | Testa | 707/999.006 |
| 7,889,712 B2 | * | 2/2011 | Talur et al. | 370/351 |
| 7,986,643 B2 | * | 7/2011 | Thubert et al. | 370/256 |
| 8,040,823 B2 | * | 10/2011 | Lin et al. | 370/256 |
| 2001/0050911 A1 | * | 12/2001 | Eastman | 370/352 |
| 2009/0164430 A1 | * | 6/2009 | Chen | 707/3 |
| 2010/0195653 A1 | * | 8/2010 | Jacobson et al. | 370/392 |
| 2010/0223300 A1 | * | 9/2010 | Kominek et al. | 707/803 |
| 2012/0059821 A1 | * | 3/2012 | Li et al. | 707/728 |

* cited by examiner

Primary Examiner — James Trujillo
Assistant Examiner — Pavan Mamillapalli
(74) Attorney, Agent, or Firm — Moser Taboada; Joseph Pagnotta

(57) ABSTRACT

A method and apparatus for accessing data using an N-leg search tree including determining a tree identifier using a computer, traversing an N-leg search tree associated with the tree identifier, and accessing a data structure. The N-leg search tree is stored on a computer and traversed to a given node within the tree. The accessed data structure is associated with a deepest valid traversed node. The given node corresponds to a given element of a structured identifier.

22 Claims, 11 Drawing Sheets

| PREFIX | COUNTRY | ROUTE STRING |
|---|---|---|
| 1 | USA | GATEWAY1, GATEWAY2 |
| 1876 | JAMAICA | GATEWAY21, GATEWAY31 |
| 18763 | JAMAICA (CELLULAR) | GATEWAY22, GATEWAY32 |
| 20 | EGYPT | GATEWAY61, GATEWAY71 |
| 2012 | EGYPT (CELLULAR) | GATEWAY62, GATEWAY71 |
| 202 | EGYPT - CAIRO | GATEWAY63, GATEWAY71 |
| 203 | EGYPT - ALEXANDRIA | GATEWAY64, GATEWAY71 |
| 502 | GUATEMALA | GATEWAY41, GATEWAY51 |
| 50299 | GUATEMALA (CELLULAR) | GATEWAY42, GATEWAY51 |
| 505 | NICARAGUA | GATEWAY43, GATEWAY52 |
| 5052 | NICARAGUA - MANAGUA | GATEWAY44, GATEWAY52 |
| 506 | COSTA RICA | GATEWAY45, GATEWAY53 |
| 5063 | COSTA RICA (CELLULAR) | GATEWAY46, GATEWAY53 |
| 53 | CUBA | GATEWAY47, GATEWAY54 |
| 539 | CUBA - GUANTANAMO | GATEWAY48, GATEWAY54 |
| 593 | ECUADOR | GATEWAY5, GATEWAY4 |
| 5932 | ECUADOR - QUITO | GATEWAY3, GATEWAY4 |
| 593728 | ECUADOR - CUENCA | GATEWAY4, GATEWAY5 |
| 63 | PHILIPPINES | GATEWAY80, GATEWAY90 |
| 632 | PHILIPPINES - MANILA | GATEWAY81, GATEWAY90 |
| 63929 | PHILIPPINES (CELLULAR) | GATEWAY82, GATEWAY90 |
| 92 | PAKISTAN | GATEWAY83, GATEWAY90 |
| 923 | PAKISTAN (CELLULAR) | GATEWAY84, GATEWAY90 |
| 9251 | PAKISTAN - ISLAMABAD | GATEWAY85, GATEWAY90 |
| 961 | LEBANON | GATEWAY10, GATEWAY20 |
| 9611 | LEBANON - BEIRUT | GATEWAY11, GATEWAY20 |
| 96170 | LEBANON (CELLULAR) | GATEWAY12, GATEWAY20 |
| 966 | SAUDI ARABIA | GATEWAY13, GATEWAY21 |
| 96612 | SAUDI ARABIA - RIYADH | GATEWAY14, GATEWAY21 |
| 9662 | SAUDI ARABIA - JEDDAH | GATEWAY15, GATEWAY21 |
| 96623 | SAUDI ARABIA - MECCA | GATEWAY16, GATEWAY21 |
| 9665 | SAUDI ARABIA (CELLULAR) | GATEWAY17, GATEWAY21 |

| LOCATION PREFIX | TREE ID | DESTINATION | DOCK ID |
|---|---|---|---|
| 111 | 0 | NORTH AMERICA | 1000 |
| 1110 | 0 | USA | 1100 |
| 1110100 | 0 | USA, ALBANY, NY | 1110 |
| 1110160 | 0 | USA, NYC, NY | 1112 |
| 1110322 | 0 | USA, HOLMDEL, NJ | 1122 |
| 1111 | 0 | CANADA | 1200 |
| 1111100 | 0 | CANADA, TORONTO, ONTARIO | 1200 |
| 1113 | 0 | GREENLAND | 1200 |
| 213 | 0 | WESTERN EUROPE | 2000 |
| 21320 | 0 | ITALY | 2100 |
| 213201207 | 0 | ITALY, CAMPOBASSO, MOLISE | 2100 |
| 301 | 1 | EASTERN EUROPE | 3000 |
| 3011 | 1 | POLAND | 3100 |
| 421 | 1 | AFRICA | 4000 |
| 521 | 2 | ASIA MIDDLE EAST | 5000 |
| 5211 | 2 | ASIA MIDDLE EAST TURKEY | 5000 |
| 52116 | 2 | TURKEY, EASTERN ANATOLLA | 5000 |
| 521167 | 2 | TURKEY, TRABZON, EASTERN ANATOLLA | 5000 |
| 5211670 | 2 | TURKEY, TRABZON (PORT), EASTERN ANATOLLA | 5000 |
| 614 | 2 | WESTERN ASIA | 6000 |
| 614160 | 2 | UKRAINIAN, RIVNE | 6000 |
| 614160117 | 2 | UKRAINIAN, PIBHE, RIVNE | 6000 |
| 6144 | 2 | EUROPEAN RUSSIA | 6000 |
| 617 | 2 | SOUTHEAST ASIA | 6000 |
| 617160119 | 2 | BANGKOK, THAILAND | 6000 |
| 745 | 1 | ASIA | 7000 |
| 74516 | 1 | CHINA | 7000 |
| 745167 | 1 | HONG KONG | 7000 |
| 823 | 1 | CARIBBEAN ISLANDS | 8000 |
| 8231 | 1 | JAMAICA | 8000 |
| 961 | 1 | CENTRAL AMERICA | 9000 |
| 9616402 | 1 | HONDURAS | 9000 |
| 963 | 0 | SOUTH AMERICA | 9100 |
| 9636402 | 0 | BRAZIL, SAO PAULO | 9100 |

METHOD AND APPARATUS FOR RAPID DATA ACCESS AND DISTRIBUTION USING STRUCTURED IDENTIFIERS

BACKGROUND OF THE INVENTION

1. Field of the Invention

Embodiments of the present invention generally relate to data access and storage and, more particularly, to a method and apparatus for rapid data access and distribution using structured identifiers.

2. Description of the Related Art

Real-time computer systems require high speed, scalable data access techniques. Many such systems rely on structured alphanumeric identification codes such as phone numbers, UPC numbers, or location codes. Particular substrings within the identification codes are used to signify various attributes associated with the identifier. These structured identification codes may then be used to locate data within a data store.

Depending upon the type of identifier used, these structured identifiers and their component substrings may be of variable length. One such example is a telephone number. For the interconnected phone networks of the international telephone network, the phone numbers follow the ITU-T E.164 telephone number format standard, which specifies that an entire number should be 15 digits or shorter, and begin with a country prefix. The country prefixes consist of variable length country codes, making determining a phone number's country code a time consuming, non-trivial task. Since the country code is required before the telephone system can begin routing the phone call, it is advantageous to minimize the time spent identifying the country code. Therefore, there is a need in the art for a method and apparatus for rapid data access and distribution using structured identifiers.

SUMMARY OF THE INVENTION

Embodiments of the present invention comprise a method and apparatus for accessing data using an N-leg search tree. Embodiments of the method comprise determining a tree identifier using a computer, traversing an N-leg search tree associated with the tree identifier, and accessing a data structure. The N-leg search tree is stored on a computer. The method traverses the tree to a given node within the tree. The accessed data structure is associated with a deepest valid traversed node. The given node corresponds to a given element of a structured identifier.

Embodiments of the apparatus comprise means for determining a tree identifier, means for storing data in an N-leg search tree associated with the tree identifier for storing a given set of data, and means for traversing the N-leg search tree.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

DETAILED DESCRIPTION

A method and apparatus for rapid data access and storage using structured identifiers is described herein. The inventive method and apparatus advantageously provide for quick data reference and lookup using one or more N-Leg search trees. A tree is a graph in which any two nodes are connected by exactly one path, as well known in the arts of math and computer science. The nodes may contain data, a pointer to data, or they may be empty. An N-Leg search tree is a tree with a number N of nodes at each layer of the tree. The structure of an N-Leg search tree is discussed further with respect to FIG. 2.

Using an N-Leg search tree to perform telephone routing minimizes the search overhead for various routing table lookup functions. Furthermore, embodiments of the present invention provide for rapid storage, access, and distribution of data in a highly scalable manner.

Figure 1:
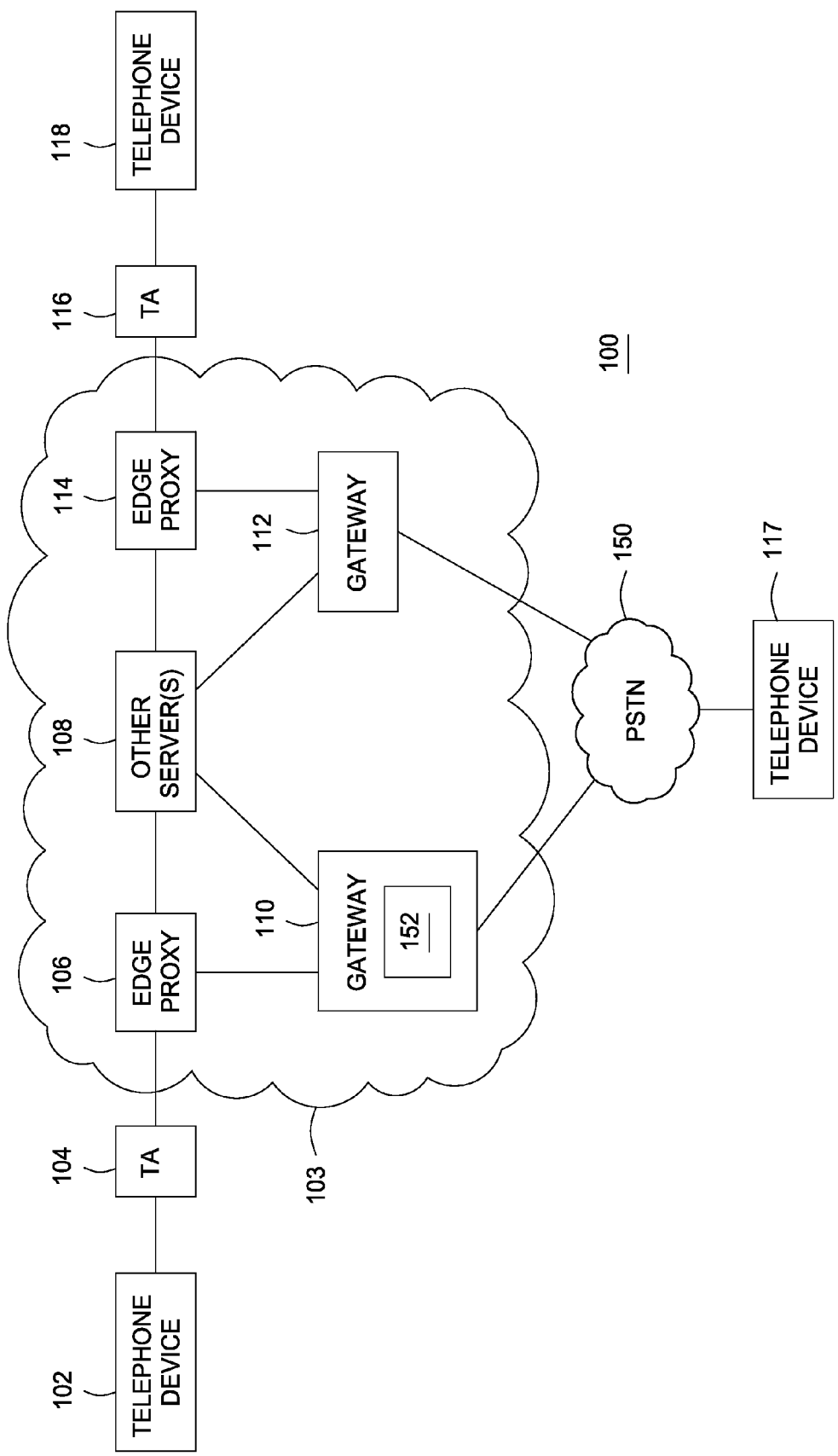
FIG. 1 is a block diagram depicting an exemplary embodiment of a communication system in accordance with one or more aspects of the invention.

FIG. 1 is a block diagram depicting an exemplary embodiment of a communication system 100 in accordance with one or more aspects of the invention. The communication system 100 includes a packet network 103 (generally referred to as a telecommunication system), a first telephone device 102, a first terminal adapter 104, a second telephone device 118, a second terminal adapter 116, and a third telephone device 117. In one embodiment of the invention, the packet network 103 is a voice-over-internet-protocol (VoIP) network. Such a VoIP network 103 communicates information using internet protocol (IP) or like type network packet protocol. The terminal adapters 104 and 116 provide an interface between the respective telephones 102 and 118 and the VoIP network 103. The terminal adapters 104 may include modems, routers, switches, hubs, and like type network components to facilitate communication with the VoIP network 103. Each of the telephone devices 102 and 118 may be a packet-based device, such as an IP phone, or a circuit-based device, such as a conventional telephone. The third telephone device 117 is coupled to a publically switched telephone network (PSTN) 150. For purposes of clarity by example, the system 100 is shown with three telephone devices 102, 117, and 118. It is to be understood that the system may include more than three telephone devices.

The VoIP network 103 includes a first edge proxy server 106, one or more other servers 108, a first gateway server 110, a second gateway server 112, and a second edge proxy server 114. Each of the servers 106 through 114 may be physically implemented using one or more computer systems (an exemplary embodiment of a computer system is described below). The first edge proxy server 106 is configured for communication with the first terminal adapter 104. The first edge proxy server 106 performs functions of authenticating the first terminal adapter 104 and registering the first terminal adapter 104 with the VoIP network 103. Once registered, calls may be received from and sent to the first TA 104. In some embodiments, calls in the VoIP network 103 are facilitated using a multimedia control protocol, such as the Session Initiation Protocol (SIP) or like type multimedia protocols. To initiate a call, the first telephone device 102 communicates with the first TA 104. The first TA 104 sends an invitation message to the VoIP network 103 (e.g., a SIP INVITE message), which is received by the first edge proxy server 106. The first edge proxy 106 then passes the invitation message to another server, such as a server 108 and/or the first gateway server 110. For an incoming call, the first edge proxy server 106 receives an invitation message (e.g., a SIP INVITE message) from another server, such as a server 108 or the first gateway server 110. The first edge proxy server 106 then forwards the invitation message to the first TA 104.

The second edge proxy server 114 is configured for communication with the second terminal adapter 116. The second edge proxy server 114 performs the same functions as the first edge proxy server 106, but with respect to the second TA 116, the second telephone device 118, and the second gateway server 112.

The first and second gateway servers 110 and 112 are coupled to the PSTN 150. The first and second gateway servers 110 and 112 facilitate the routing of calls between the PSTN 150 and the VoIP network 103 (e.g., between the telephones 102 and 118 and the telephone 117). The servers may be located anywhere in countries throughout the world. The other servers 108 may include various well known servers configured to facilitate VOIP services, such as provisioning servers, proxy servers, media relay servers, and the like.

Figure 2:
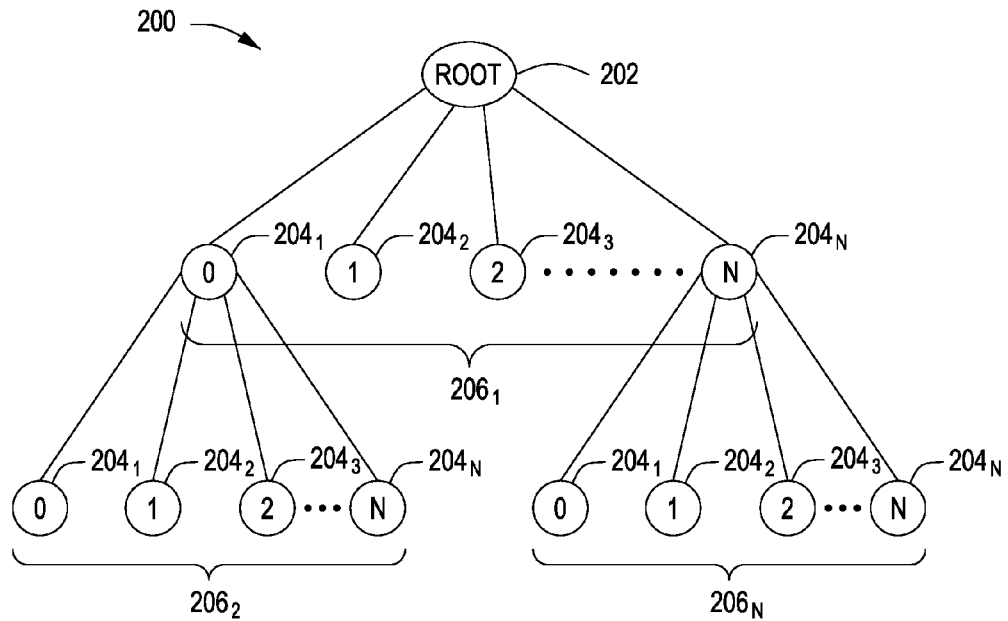
FIG. 2 is a illustrative diagram depicting an N-leg search tree used in accordance with one or more aspects of the present invention.

FIG. 2 is an illustrative diagram of an N-Leg search tree 200 in accordance with embodiments of the present invention. The N-leg search tree 200 is a tree structure as well known in the art and described above. The N-leg search tree 200 has a root 202, connected to one or more child nodes $204_1, 204_2, \ldots 204_n$. Each group of child nodes $204_1$ through $204_n$ is known as a leg 206. Each leg 206 contains a unique full set of nodes $204_1$ through $204_n$. The N-leg search tree 200 may be comprised of multiple legs $206_1, 206_2, \ldots 206_n$ connected across multiple layers.

The nodes 204 are abstract representations of basic data units. Each node 204 may contain data or a reference to data, or the node may not contain any data. The nodes 204 are used to build the linked data structure represented as the N-Leg search tree 200. In some embodiments, the nodes 204 may contain information referencing a link to another node 204. In some embodiments, such link information may contain a memory location or reference to a previous node and/or a next node.

Figure 3:
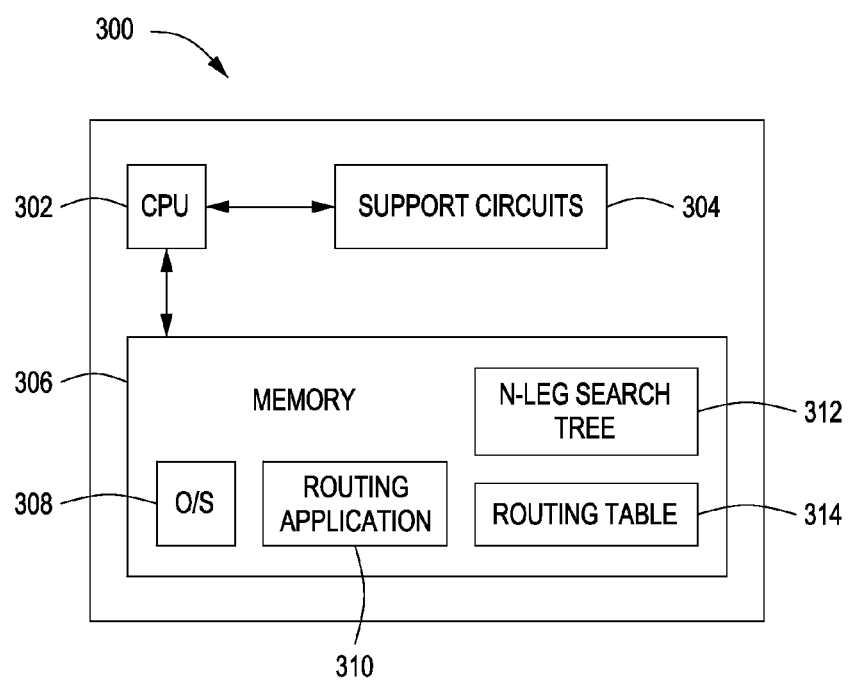
FIG. 3 is a block diagram depicting a computer operating as a telephone routing gateway in accordance with one or more aspects of the present invention.

FIG. 3 is an illustrative drawing of a computer 300 implementing an embodiment of the present invention. Said computer 300 is used to perform telephone routing functions, such as those performed by the gateways 110, 112 and/or other servers 108 described with respect to FIG. 1. In some embodiments, the gateway 300 is a server computer as generally known in the art.

The computer 300 or multiple ones of the computer 300 may be used to implement any of the servers and/or methods described herein. The computer 300 may be one of any form of a general purpose computer used in accessing and operating within an IP-based network. The computer 300 may include a central processing unit (CPU) 302, a memory 306, and various support circuits 304. The CPU 302 may include one or more microprocessors or the like as known in the art. The support circuits 304 include conventional cache, power supplies, clock circuits, data registers, and the like used in conjunction with software executing on the CPU 302. The memory 306, or computer readable medium, may include one or more of the following random access memory, read only memory, magneto-resistive read/write memory, optical read/write memory, cache memory, magnetic read/write memory, and the like.

The memory 306 may store software that is executed to perform methods of according to embodiments of the invention. For example, the software can implement at least a portion of the methods 500 and 600 performed by a gateway server or other server in the VoIP network 103. The software, when executed by the processor 302, transforms the general purpose computer into a specific purpose computer that controls methods described herein. Although embodiments of the process of the present invention are discussed as being implemented as a software routine, some of the method steps that are disclosed herein may be performed in hardware or a combination of hardware and software. As such, the invention may be implemented in software as executed upon a computer system, in hardware as an application specific integrated circuit or other type of hardware implementation, or a combination of software and hardware.

Additionally, the software may act as a "stand alone" program or may be embedded with one or more other routines or programs that provide one or more additional telecommunication services. The software of the present invention is capable of being executed on computer operating systems including but not limited to MICROSOFT WINDOWS 98, MICROSOFT WINDOWS XP, APPLE OS X and LINUX. Similarly, the software of the present invention is capable of being performed using CPU architectures including but not limited to APPLE POWER PC, AMD/INTEL x86, SUN SPARC, and INTEL ARM.

In some embodiments, the memory comprises an operating system 308, a routing application 310, an N-Leg search tree 312, and a routing table 314. In operation, the CPU 302 executes the operating system 308 to control the general utilization and functionality of the computer 300. The routing application 310 executes on the processor to access and maintain the N-Leg search tree 312 and routing table 314. In some embodiments, the routing application 310 receives a phone number from a telephone device 117, and traverses the N-Leg search tree 312 using the phone number. The end result of the tree traversal is then used to look up an entry in the routing table 314. This process is discussed further with respect to FIG. 5.

Figure 4B:
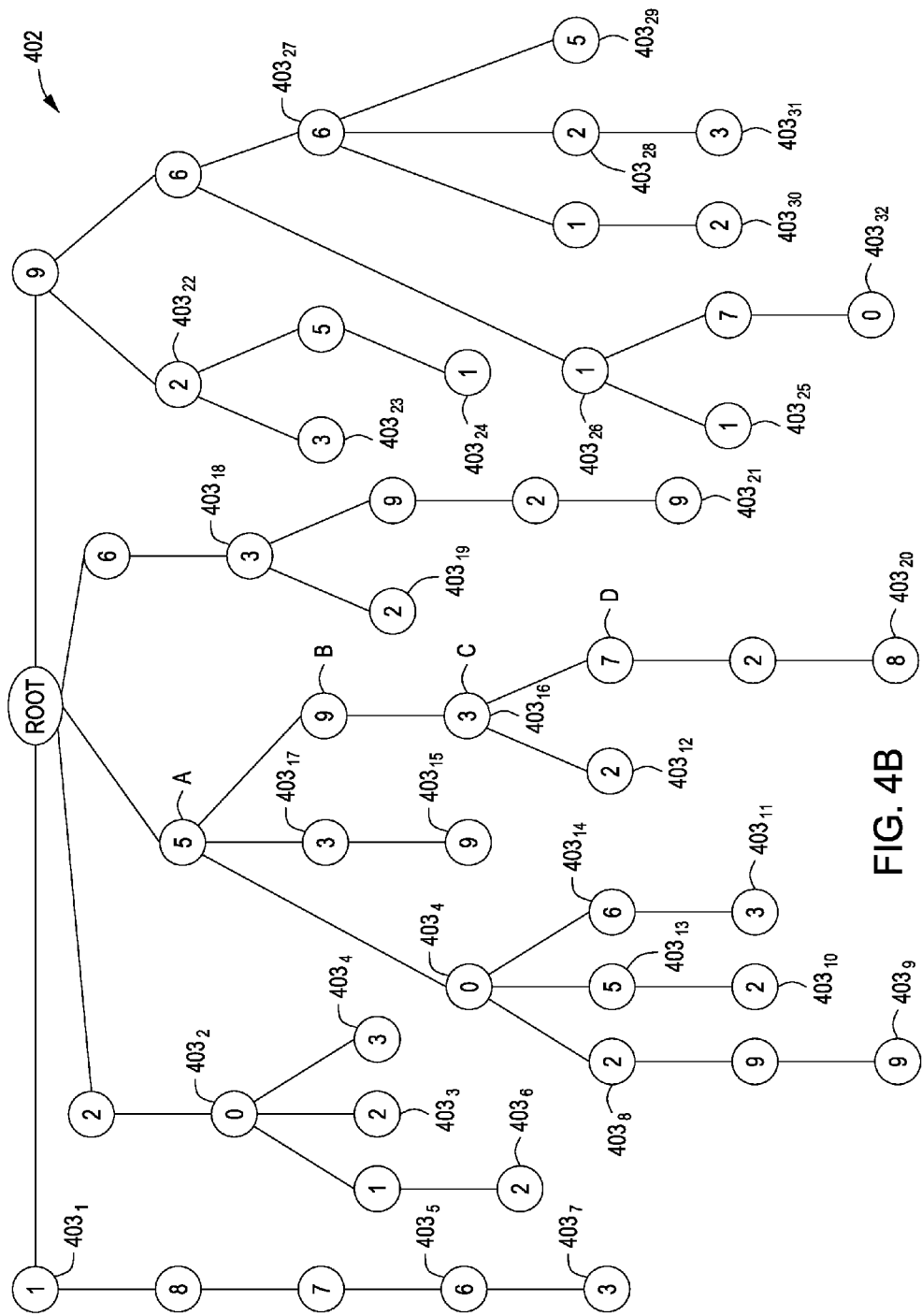
FIG. 4 is an illustrative diagram depicting an exemplary routing table and N-leg search tree in accordance with one or more aspects of the present invention.

FIG. 4 is an illustrative example of a routing table 400 and an N-Leg search tree 402 as used with embodiments of the present invention. The routing table 400 contains various country code based prefixes associated with particular countries. Each prefix begins with a country code and may include additional in country phone number digits. Each country and prefix is also associated with one or more particular gateways for routing calls to a certain geographical region. For example, a phone call with the prefix "1" is associated with the "USA" entry. An outgoing call with this prefix would be routed to Gateway1 or Gateway2.

The N-Leg search tree 402 is a representational drawing of the N-Leg search tree associated with the routing table 400. Each entry of the routing table has a corresponding node $403_1$, $403_2$ ... $403_{31}$ to which it is associated. To determine which gateway to access, the routing application 310 traverses the tree 402 using the digits of the outgoing phone number. The routing application 310 continues to traverse the tree 402, using a single digit for each node, until a dead-end node is reached or there is no valid node for the next digit in the number. When there is no valid next destination node, the routing application 310 accesses the contents of the last node that had valid data. Only nodes $403_1$ through $403_{31}$ that correspond to entries within the table 400 contain valid data pointing to a gateway. If the search ends on a node that does not contain valid data, the data of last previously traversed node with valid data is accessed.

For example, if the routing application 310 received an incoming call number of "59379135790", the application would first traverse to node A, representing the digit "5". Since the next digit is the valid destination digit of "9", the application would then proceed to node B. The application would traverse the tree to node C $403_{16}$ and node D, representing the digits "3" and "7", respectively. Since the next digit "9" is not a valid destination from node D, the application would stop traversing the tree at this point and determine the last visited node that contained valid data. Since node D does not contain valid data as described above and seen in tree 402, the application would return to node C $403_{16}$ and access the valid data stored therein. In this example, node C $403_{16}$ contains the data that points to a route string of Gateway4, Gateway5 associated with Ecuador. In this manner, the N-Leg search tree allows for the searching of an identifier when the length of the identifier is variable, without the need to pattern match the entire identifier within a traditional index structure.

Figure 5:
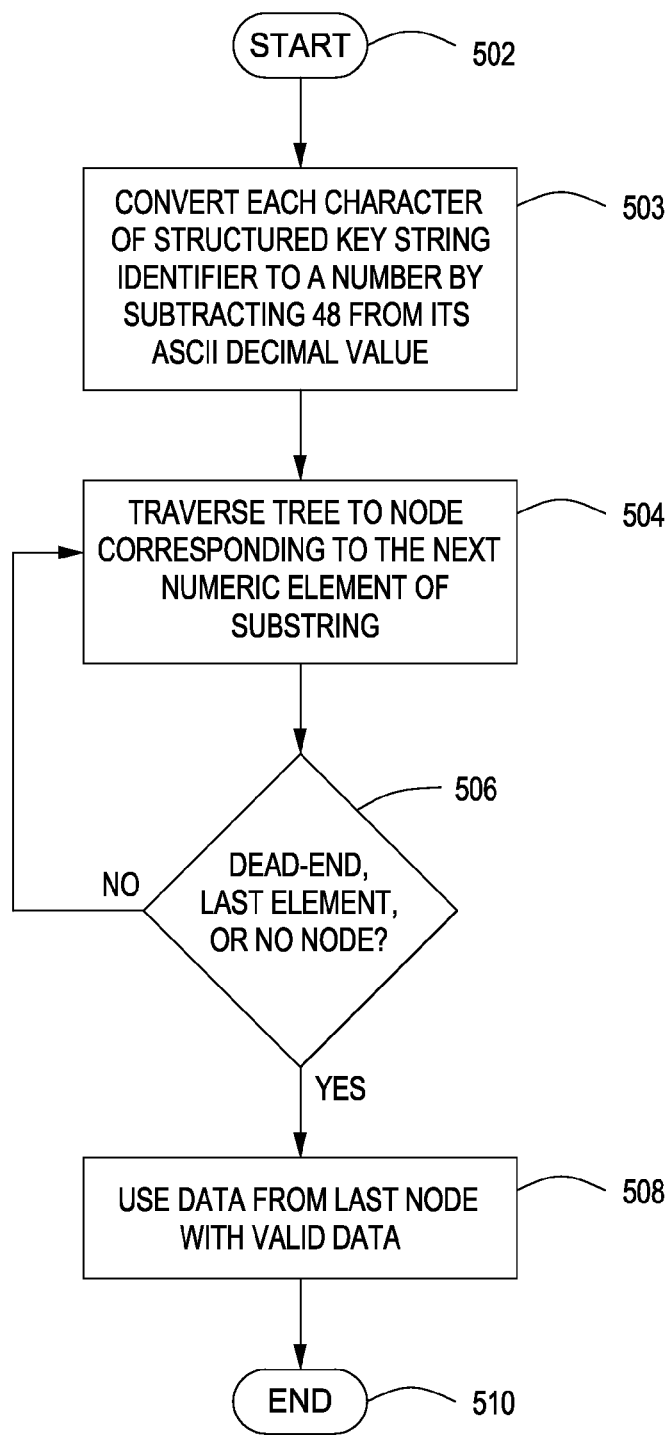
FIG. 5 is a flow diagram depicting a method for traversing an N-leg search tree in accordance with one or more aspects of the present invention.

FIG. 5 is a flow diagram illustrating an embodiment of a method 500 for traversing an N-Leg search tree in accordance with embodiments of the present invention. The method begins at step 502, when the tree must be traversed to identify a structured identifier, such as an incoming phone number to a routing application 310. The method then proceeds to step 503.

At step 503, each character of the structured key string identifier is converted from an ASCII value to a numeric decimal value by subtracting 48 from its ASCII value. By applying this method, numeric ASCII characters are converted to the numeric decimal value the characters represent. Alpha characters will have a decimal numeric value that is 48 less than their ASCII value. For example, the character 'A' has an ASCII value of 65 and would be converted to the numeric decimal value 17. Converting ASCII characters to decimal numbers facilitates traversal of the structured tree. The method then proceeds to step 504.

At step 504, the method traverses the tree to the next element of the structured identifier, such as a first digit of a phone number. At step 506, the method determines if the currently reviewed element corresponds to a dead-end node (i.e. the node has no child nodes), if the element is the last element of the structured identifier (i.e. the structured identifier has no additional elements), or if there is no node that corresponds to the currently reviewed element (e.g. there are child nodes, but no child node corresponding to the given element). If the node is a dead-end node, the currently reviewed element is the last element in the structured identifier, or there is no node corresponding to the currently reviewed element, then the method proceeds to step 508. Otherwise, the method proceeds to step 504 and the next element in the structured identifier is reviewed.

At step 508, the method accesses the data at the last traversed node with valid data. For some traversals, the final node reviewed may not have valid data associated with it, such as in the case of variable length substrings, where the last element is actually the first element of the next substring. In this case, the method traverses up the tree to the deepest node which was associated with valid data. The method ends at step 510, when the appropriate data has been accessed.

Figure 6:
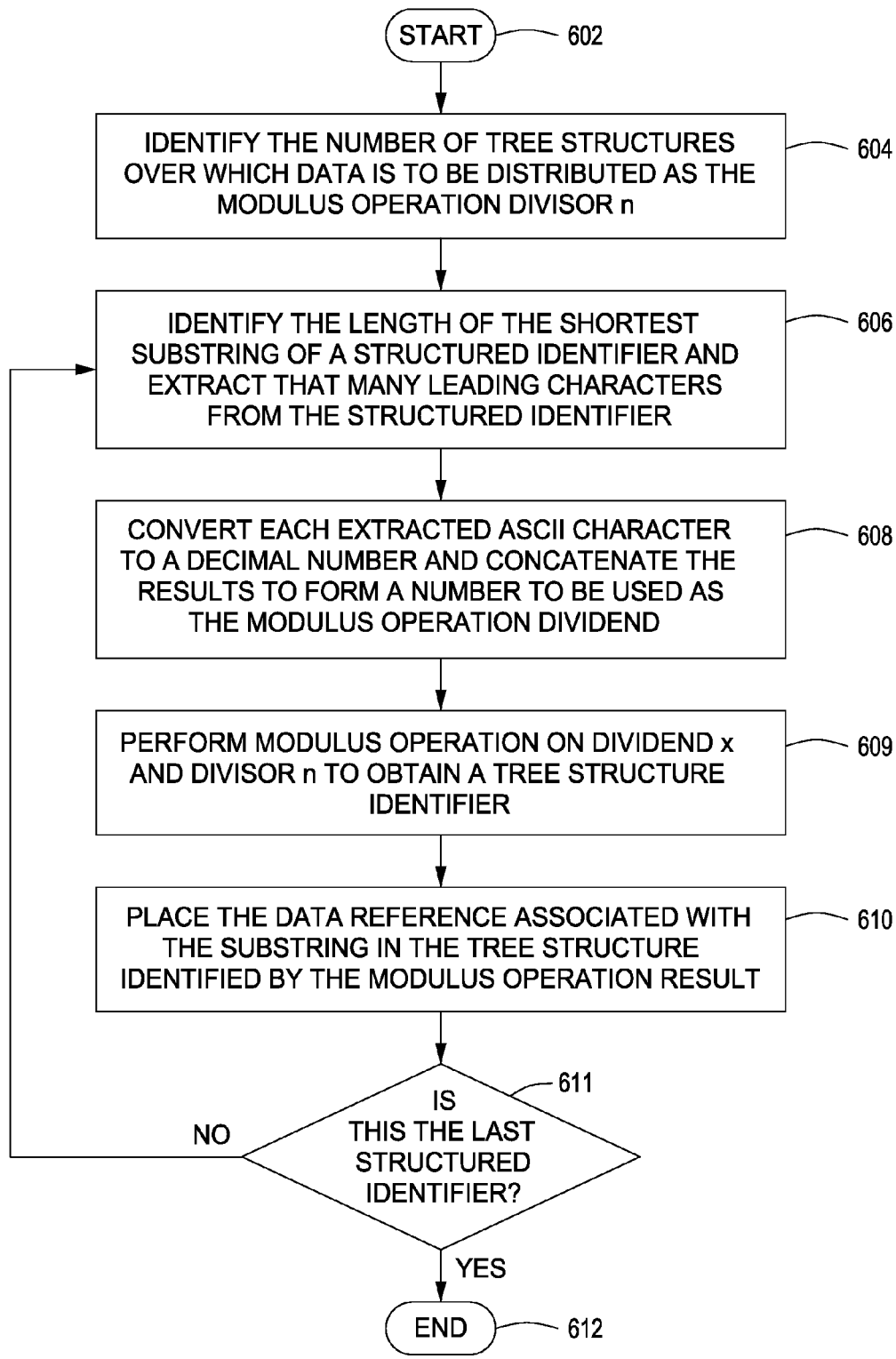
FIG. 6 is a flow diagram depicting a method for implementing a scalable structure in an N-leg search tree in accordance with one or more aspects of the present invention.

FIG. 6 is a flow diagram of a method 600 for implementing a scalable structure using one or more N-leg search trees. As N-Leg search trees grow in size, search time increases. To avoid this situation, the tree data can be distributed among two or more trees. Data may be distributed and retrieved among the tree structures based on a modulus value and the data's structured key identifier substrings.

The method 600 begins at step 602, with a set of data that will be distributed among a fixed number of tree structures that are assigned a numeric identifier of zero to n−1 where n is the total number of tree structures. At step 604, the method identifies the number of tree structures over which the data will be distributed. That number is used as the modulus divisor. At step 606, the method identifies the value of the modulus dividend. The modulus dividend is established from the substring of a structured identifier. To do so, the length of the shortest substring of all the structured identifiers is determined. For example, the length of the shortest substring of a package delivery location code may have a length of 3 characters, with some location codes having substrings with more than 3 characters. The shortest substring length value is used to extract that many leading characters from each of the substrings.

At step 608, the ASCII value of each extracted character is converted to a decimal number by subtracting 48 from the ASCII value. The numbers are then concatenated in the order they were extracted to form a number. For numbers n1, n2 and n3, the formed number is n1n2n3. For example, when the shortest substring length is 3 and a substring contains 745167, the characters 7, 4 and 5 are extracted from the substring. The numeric conversion of the ASCII values results in numeric values of 7, 4, and 5. These values are concatenated to form the number 745 which will be used as the dividend of the modulus operation. For an alpha numeric substring example, when the shortest substring length is 3 and the substring contains alphanumeric characters such as 2A5482Z3, the first 3 characters are converted from ASCII to numeric values of 2, 17, and 5. When concatenated, the resulting number is 2175 and that number is used as the dividend of the modulus operation. For this example, if the total number of tree structures is 4, the modulus operation result is 3 so the data associated with that substring is placed in the tree structure having an ID of 3.

At step 609, the method performs a modulus operation on the dividend x and divisor n. The result is the remainder of x divided by n.

At step 610, the method uses the results of the modulus operation to place the data reference associated with the structured key identifier in the tree structure identified by the modulus operation result. Steps 606 through 610 are repeated for all structured identifiers. When the trees are to be traversed later to retrieve data identified by a particular substring, the same modulus operation is performed to identify the tree to be traversed. The search operation then proceeds as normal as discussed with respect to FIG. 5. An example of the tree assignment process is discussed with respect to FIG. 7.

Figure 7B:
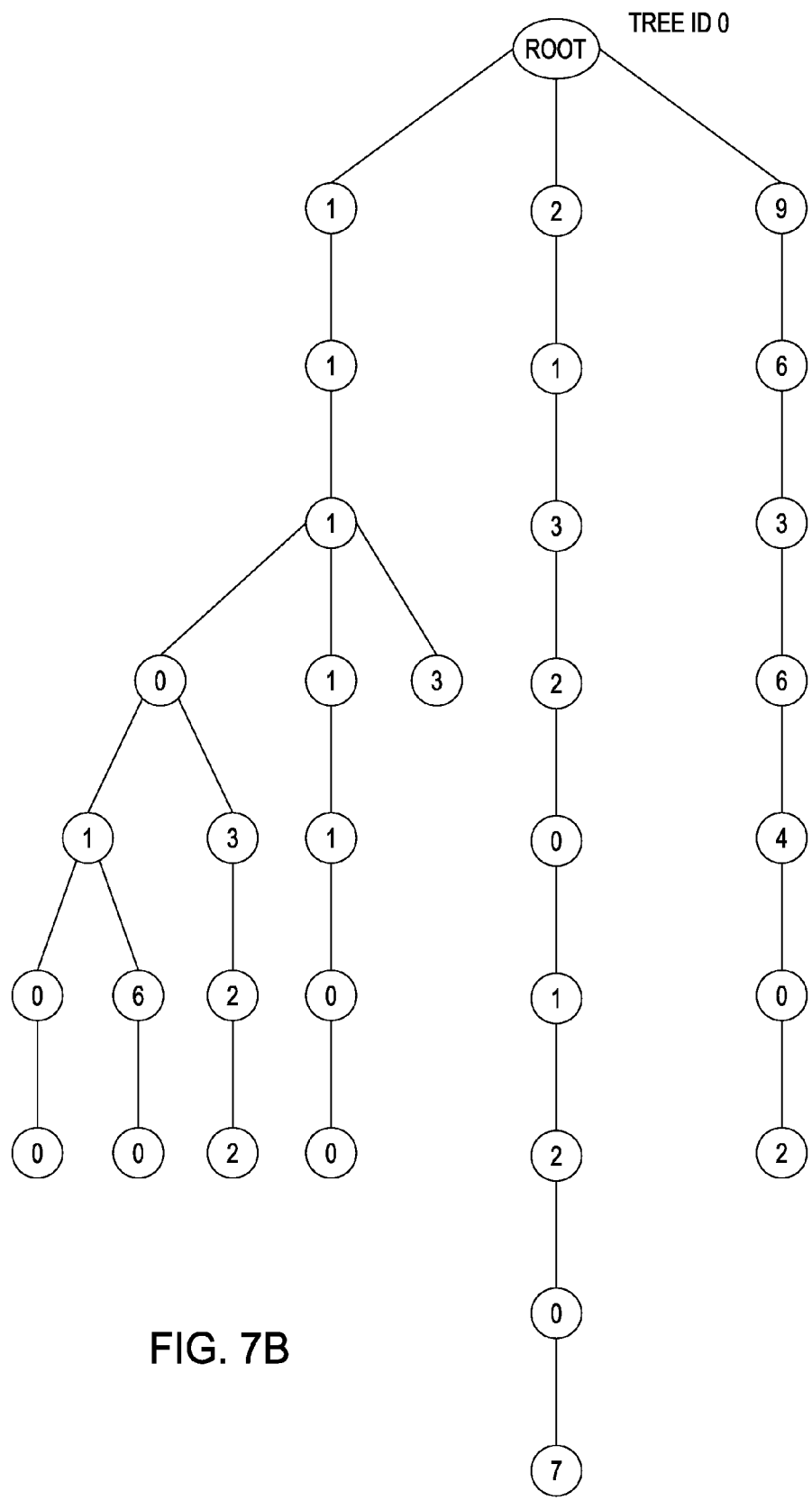
FIG. 7 is an illustrative diagram depicting a data table and individual data trees in accordance with one or more aspects of the present invention.
Figure 7C:
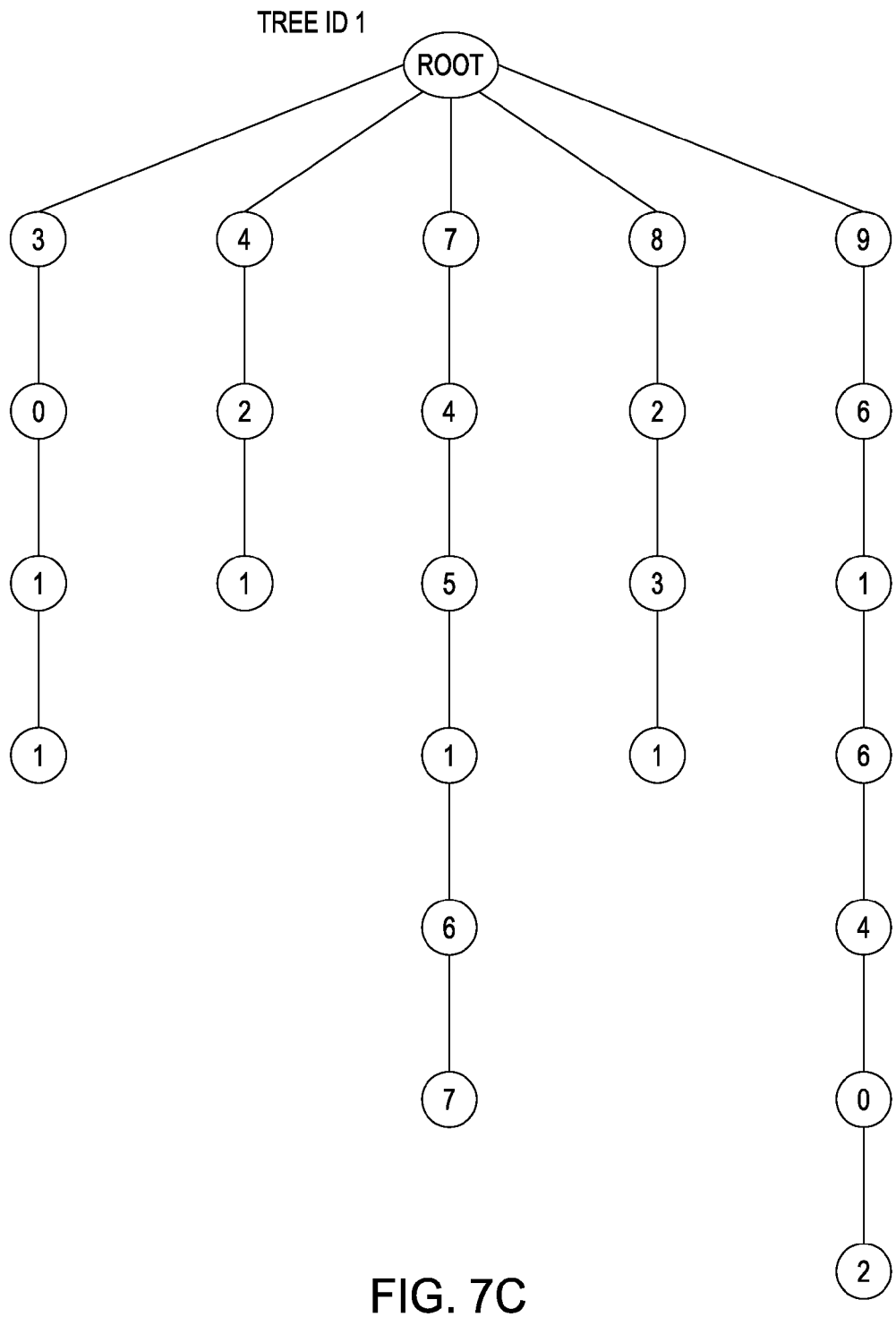
Figure 7D:
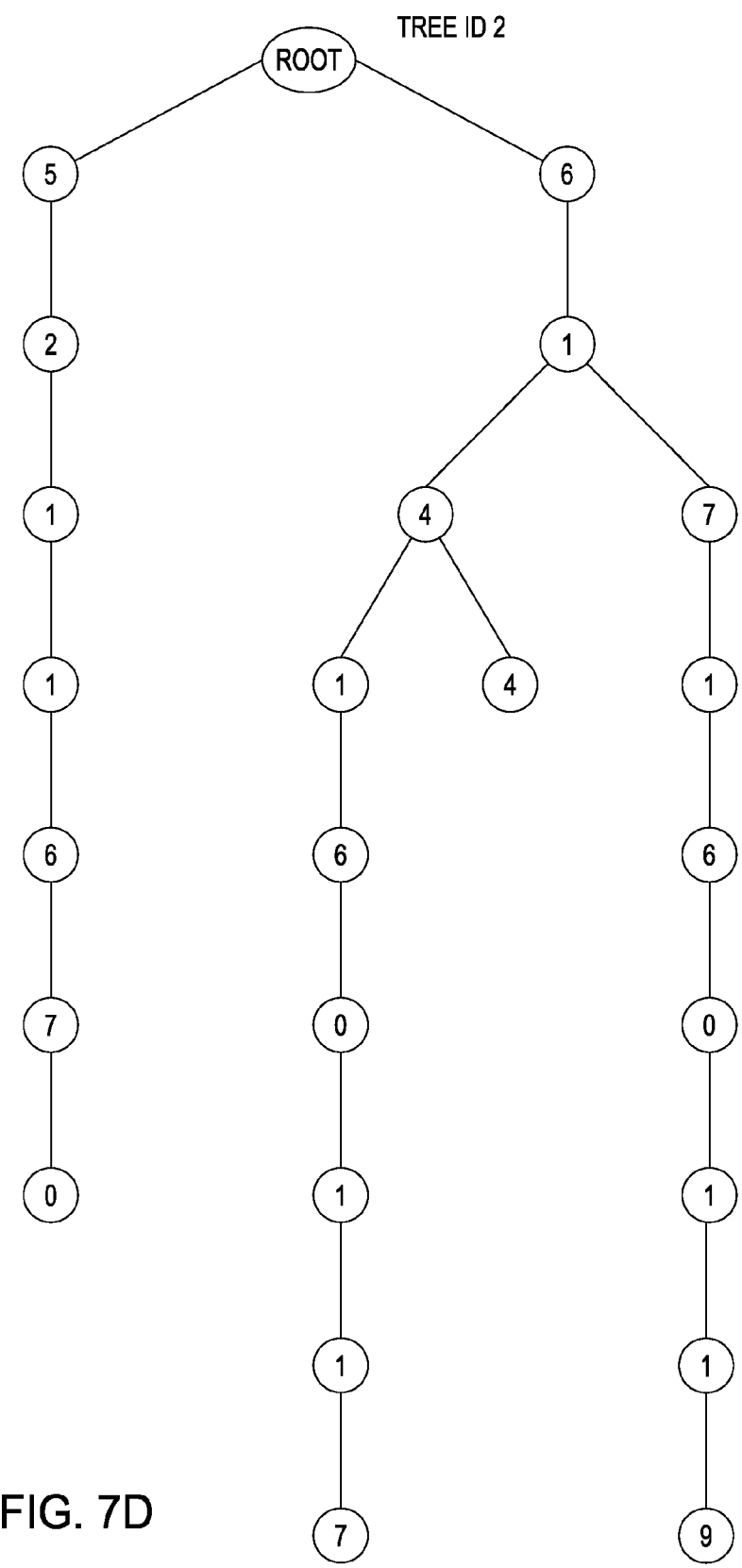

FIG. 7 depicts an illustrative example of the method 600 discussed with respect to FIG. 6. FIG. 7A depicts a table containing location codes for various country locations. Each location code is associated with a particular country destination and a loading dock ID. The table data is distributed among 3 tree structures as shown in FIGS. 7B, 7C and 7D. As can be readily discerned from the example table, the minimum length of the location prefix is three characters. The first three elements of each location prefix are concatenated to form a numeric value as per 606 and 608 of method 600 and divided by 3, the number of tree structures over which the data is distributed, to produce a remainder. The remainder is used as a tree ID. FIGS. 7B, 7C, and 7D illustrate the elements of the table 700 as parsed into three separate trees. Each element of the tree links back to the appropriate dock number in the same manner as discussed with respect to FIG. 4. The tree ID is determined from the minimum length substring based modulo operation discussed with respect to FIG. 6. Each location prefix is concatenated as per 606 and 608 of method 600 and is divided by the number of tree structures over which the data is distributed (in this case, the number of structures is 3). The remainder of this division operation is the tree ID for the particular structured identifier.

Once the tree ID for a particular identifier has been determined, a node corresponding to that identifier is inserted into the appropriate tree, again using the method disclosed with respect to FIG. 4. Each node corresponding to the final digit of a location prefix contains data. In the present example, the node corresponding to the final digit would include data associated with the destination and dock ID of the location prefix associated with the node. In some embodiments, the node may include a reference to a data structure such as a memory location, rather than the data itself.

Figure 8:
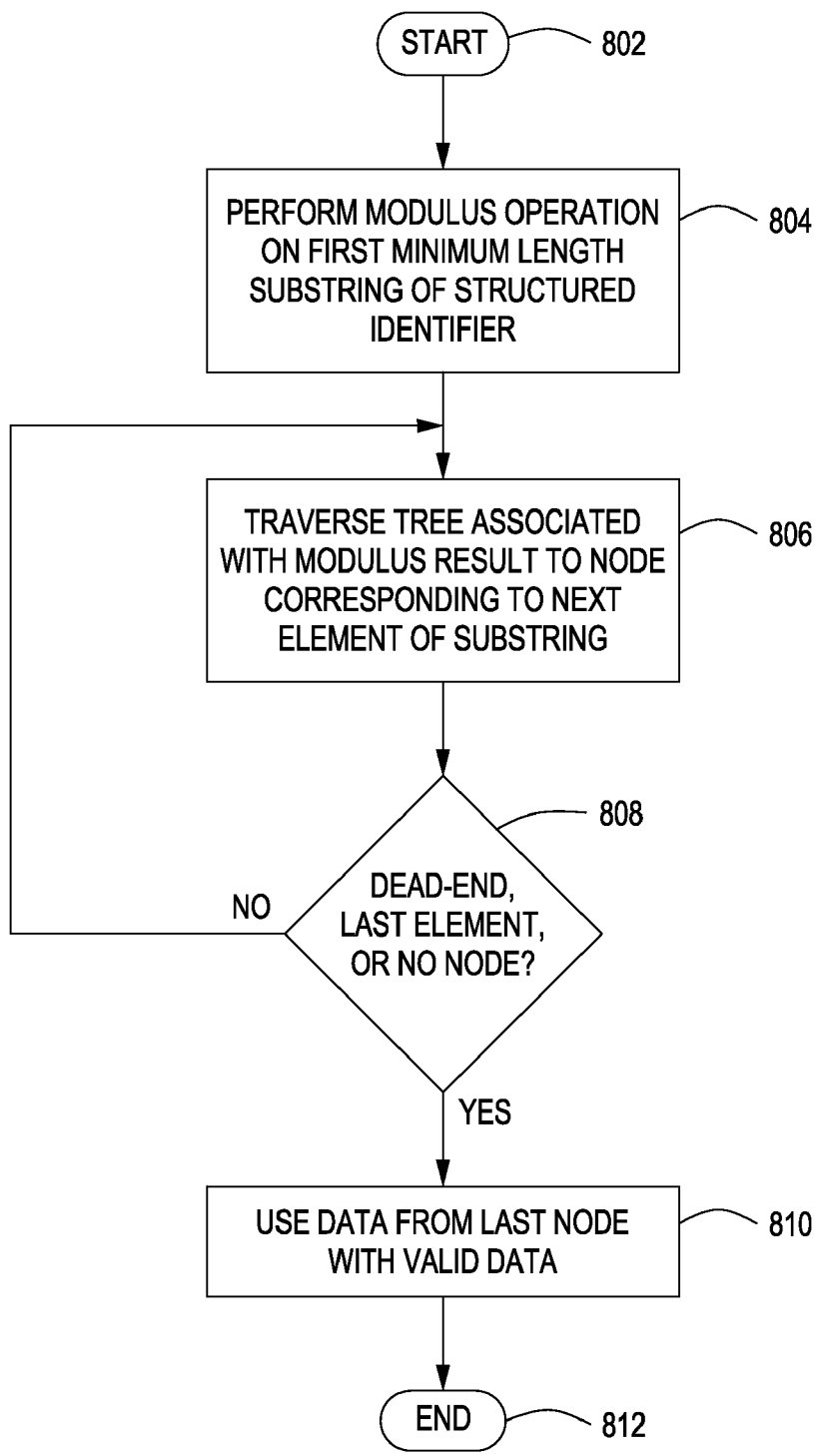
FIG. 8 is a flow diagram depicting a method for accessing a scalable structure in an N-leg search tree in accordance with one or more aspects of the present invention.

FIG. 8 is a flow diagram illustrating an embodiment of a method 800 for traversing an N-Leg search tree in accordance with embodiments of the present invention where data is distributed among multiple N-Leg search tree structures. The method begins at step 802, where a particular substring of a structured identifier has been identified for data access. For example, one such substring might be the location prefix identified with respect to FIG. 7A. The method proceeds to step 804.

At step 804, the method performs a modulo operation on the first "n" characters of the given substring as per 606 and 608 of method 600, where "n" represents the number of characters that compose the shortest substring. This minimum number of characters is determined at the time the trees are generated. For example, the minimum substring length of the location prefix identified in FIG. 7A is 3, because there are no location prefixes with fewer than 3 characters. The modulo operation consists of dividing the numeric value of the first "n" characters of the substring as per 606 and 608 of method 600 by the number of tree structures over which the data is distributed, and then returning the remainder as the result. For example, for a substring containing "5211", and the number of tree structures was 3, the method would divide 521 by 3, giving a resulting remainder of 2.

At step 806, the method traverses the tree identified by the result of step 804 to a node corresponding to the next element of the substring. At step 808, the method determines if the currently reviewed element corresponds to a dead-end node (i.e. the node has no child nodes), if the element is the last element of the structured identifier (i.e. the structured identifier has no additional elements), or if there is no node that corresponds to the currently reviewed element (e.g. there are child nodes, but no child node corresponding to the given element). If the node is a dead-end node, the currently reviewed element is the last element in the structured identifier, or there is no node corresponding to the currently reviewed element, then the method proceeds to step 810. Otherwise, the method proceeds to step 806 and the method reviews the next element of the structured identifier.

At step 810, the method accesses the data at the last traversed node with valid data. For some traversals, the final node reviewed may not have valid data associated with it, such as in the case of variable length substrings, where the last element is actually the first element of the next substring. In this case, the method traverses up the tree to the deepest node which was associated with valid data. The method ends at step 812, when the appropriate data has been accessed.

While the foregoing is directed to embodiments of the present invention, other and further embodiments of the invention may be devised without departing from the basic scope thereof, and the scope thereof is determined by the claims that follow.

The invention claimed is:

1. A method for accessing data stored on a computer system including one or more computers on a network, the method comprising:
    determining a tree identifier using the computer system;
    traversing, using the computer system, an N-leg search tree associated with the tree identifier stored on a computer, to a given node within the N-leg search tree, wherein the given node corresponds to a given element of a structured identifier; and
    accessing a data structure associated with a deepest valid traversed node, wherein the deepest valid traversed node is determined by:
    (a) determining whether data stored at the given node is valid;
    (b) when the data stored at the given node is determined to be valid, determining that the given node is the deepest valid traversed node; and
    (c) when the data stored at the given node is determined to be not valid, traversing back up the N-leg search tree to a first parent node that stores valid data, and determining that the first parent node that stores valid data is the deepest valid traversed node.

2. The method of claim 1, wherein the tree identifier is determined by a method comprising:
    determining a minimum number of members of the given element;
    performing a modulo operation using a value corresponding to the minimum number of members of the given element of the structured identifier and a number of N-leg search trees used to store the data; and
    using a result of the modulo operation as the tree identifier.

3. The method of claim 1, further comprising accessing a child node of the given node, wherein the child node is associated with a next element of a structured identifier.

4. The method of claim 1, wherein the traversing step is performed for each element of the structured identifier until at least one condition occurs, wherein the condition is one of a group consisting of: where the child node is a dead-end node, where the next element is a last element of the structured identifier, and where no node corresponds to the given element.

5. The method of claim 1, wherein the structured identifier comprises one or more substrings of variable length.

6. The method of claim 1, wherein the N-leg search tree comprises telephony routing data.

7. The method of claim 6, wherein the structured identifier is a phone number comprising one or more substrings of variable length.

8. The method of claim 7, wherein one of the one or more substrings is a telephone country code.

9. The method of claim 6, wherein the data structure comprises an element of a telephone routing table comprised of one or more prefix substrings and one or more routing elements associated with the one or more prefix substrings.

10. The method of claim 1, wherein the structured identifier is a first set of ASCII characters, each ASCII character in the set having an ASCII decimal value, the method further comprising converting the structured identifier from the first set of ASCII characters to a second set of numeric values by subtracting 48 from the ASCII decimal value of each ASCII character.

11. A method for implementing a scalable data access architecture for data stored on a computer, executed on a computer processor, the method comprising:
    determining a minimum number of members for an element of a structured identifier using a computer;
    performing a modulo operation on the structured identifier, wherein the modulo operation uses a value corresponding to the minimum number of members of the element of the structured identifier and a number of N-leg search trees used to store the data; and
    inserting the structured identifier into an N-leg search tree corresponding to a result of the modulo operation.

12. The method of claim 11, wherein a last member of the element of the structured identifier corresponds to a child node containing a data structure.

13. The method of claim 12, wherein the data structure comprises an element of a telephone routing table comprised of one or more prefix substrings and one or more routing elements associated with the one or more prefix substrings.

14. The method of claim 11, wherein the N-leg search tree comprises telephony routing data.

15. The method of claim 14, wherein the structured identifier is a telephone number.

16. The method of claim 15, wherein the element of the structured identifier is a country code.

17. The method of claim 11, wherein the structured identifier is a first set of ASCII characters, each ASCII character in the first set having an ASCII decimal value, the method further comprising converting the structured identifier from the first set of ASCII characters to a second set of numeric values by subtracting 48 from the ASCII decimal value of each ASCII character.

18. An apparatus for data access and distribution comprising:
    a) at least one processor; and
    b) at least one storage device storing processor-executable instructions which, when executed by the at least one processor, perform a method including:
        storing data in one or more N-leg search trees;
        determining a tree identifier from a given structured identifier;
        traversing an N-leg search tree associated with the tree identifier to a given node within the N-leg search tree; and
        accessing a data structure associated with a deepest valid traversed node, wherein the deepest valid traversed node is determined by:
            (1) determining whether data stored at the given node is valid;
            (2) when the data stored at the given node is determined to be valid, determining that the given node is the deepest valid traversed node; and
            (3) when the data stored at the given node is determined to be not valid, traversing back up the N-leg search tree to a first parent node that stores valid data, and determining that the first parent node that stores valid data is the deepest valid traversed node.

19. The apparatus of claim 18, wherein the act of traversing the N-leg search tree includes:
    traversing the N-leg search tree associated with the tree identifier to the given node within the N-leg search tree, wherein the given node corresponds to a given element of a structured identifier;
    accessing a child node of the given node, wherein the child node is associated with a next element of the structured identifier; and
    repeating the traversing and accessing steps for each element of the structured identifier until at least one condition occurs, wherein the at least one condition is at least one of the child node is a dead-end node, the next element is the last element of the structured identifier, or no node corresponds to the given element.

20. The apparatus of claim 19, wherein the act of determining the tree identifier includes:
    determining a minimum number of members of the given element;
    performing a modulo operation using a value corresponding to the minimum number of members of the given element of the structured identifier and a number of N-leg search trees used to store the data; and
    using the result of the modulo operation as the tree identifier.

21. The apparatus of claim 18, wherein the N-leg search tree stores telephone routing information and the method further includes:
    performing telephone routing operations.

22. The apparatus of claim 21, further comprising:
    a telephone routing table comprised of one or more prefix substrings and one or more routing elements associated with the one or more prefix substrings.

* * * * *